United States Patent [19]
Cobbledick et al.

[11] Patent Number: 5,084,353
[45] Date of Patent: Jan. 28, 1992

[54] THERMOSETTING IN-MOLD COATING COMPOSITIONS

[75] Inventors: David S. Cobbledick, Kent; Donald F. Reichenbach, Massillon; Brian Sullivan, Akron; Robert L. Spencer, Lyndhurst, all of Ohio

[73] Assignee: GenCorp Inc., Fairlawn, Ohio

[21] Appl. No.: 351,353

[22] Filed: May 12, 1989

[51] Int. Cl.⁵ .................. B32B 27/38; B32B 27/06
[52] U.S. Cl. .................... 428/413; 106/38.2; 428/480; 428/482; 428/483; 428/288; 428/522; 252/511; 252/411.1
[58] Field of Search ............ 252/511, 518; 106/38.2, 106/38.28; 428/432, 411, 413, 480, 482, 483, 288, 522, 392, 408

[56] References Cited

U.S. PATENT DOCUMENTS

| | | |
|---|---|---|
| 4,081,578 | 3/1978 | Van Essen et al. |
| 4,414,173 | 11/1983 | Cobbledick et al. |
| 4,515,710 | 5/1985 | Cobbledick et al. |
| 4,534,888 | 8/1985 | Cobbledick et al. |
| 4,719,038 | 1/1988 | Sobata et al. ............ 252/511 |

Primary Examiner—Josephine Barr

[57] ABSTRACT

A fiber glass reinforced plastic can be in-mold coated utilizing a free radical peroxide initiated thermosetting composition of at least one polymerizable epoxy based oligomer having at least two acrylate groups, at least one copolymerizable ethylenically unsaturated monomer, at least one copolymerizable monoethylenically unsaturated compound having a —CO— group and a —NH$_2$, —NH—and/or —OH group, and other conventional components such as at least one zinc salt of a fatty acid, at least one accelerator, at least one filler, and the like. The thermosetting compositions of the present invention utilize a very low or nil amount of an adhesion agent such as a polyvinyl acetate and unexpectedly achieves better flow and good coverage at reduced coating weights.

7 Claims, No Drawings

THERMOSETTING IN-MOLD COATING COMPOSITIONS

FIELD OF THE INVENTION

The present invention relates to a thermosetting in-mold coating composition wherein reduced coating weights are used for in-mold coating a molded fiber glass reinforced thermoset plastic (FRP) such as a polyester resin or a vinyl ester resin molding or part that usually does not require the combining of two or more components immediately prior to use.

BACKGROUND

Heretofore, a major drawback of compression molded thermoset glass fiber reinforced plastics (FRP) was that they had surface imperfections such as pits, pores, surface cracks, waviness and sink marks.

The in-mold coating process of U.S. Pat. No. 4,081,578 generally overcomes these imperfections by molding a low viscosity thermoset on top of the FRP in a second molding operation. The composition described in U.S. Pat. No. 4,081,578 contains free hydroxyl as well as isocyanate groups that co-react at room temperature, resulting in a limited (about one-half hour) pot life. In practice, the reactive ingredients are kept apart, and combined only immediately prior to application. This necessitates dual pumping equipment and an accurate metering device, which increase the cost and complexity of the system. A single component coating would thus offer a significant advantage. Moreover, conductive carbon black does not dispense well in isocyanate based in-mold coating compositions such as set forth in U.S. Pat. No. 4,081,578, and it is difficult to obtain after in-mold coating and subsequent electrostatic painting, a paint layer which is even.

While U.S. Pat. Nos. 4,414,173, 4,515,710 and 4,534,888 to Cobbledick substantially overcame the above-noted problems, good coverage was obtained only at high coating weights.

SUMMARY OF THE INVENTION

It is thus an aspect of the present invention to provide better flow as well as good coverage of a thermosetting coating composition utilizing lower coating weights.

It is also an aspect of the present invention to provide a coating having improved hardness at high temperatures (e.g. 300° F).

Such improved thermosetting coating compositions are obtained by drastically reducing the amount of adhesive agent such as polyvinyl acetate to levels essentially below 20 or 18 parts by weight for every 100 parts by weight of at least one polymerizable epoxy-based oligomer having at least two acrylate groups and a weight average molecular weight of from about 500 to about 1,500. Such thermosetting in-mold compositions are generally stable for about a week even when containing a peroxide initiator, can be molded in a relatively short period of time, exhibit good adhesion to different FRP substrates, generally have good paint adhesion and do not require the need for a primer. Carbon black disperses well throughout the coating compositions and thus provide a composition which can be spray painted electrostatically to provide an even paint coating or film. The need for applying a conductive primer to the in-mold coating composition is thus eliminated.

DETAILED DESCRIPTION OF THE INVENTION

The thermosetting coating compositions of the present invention are generally based upon a polymerizable epoxy-based oligomer having at least two acrylate (or methacrylate or ethacrylate) groups is prepared by reacting acrylic acid, methacrylic acid or ethacrylic acid and so forth with an epoxy based oligomer or resin such as Bisphenol A epoxy, a tetrabromo Bisphenol A epoxy, phenolic novalak epoxy, tetraphenylolethane epoxy, dicycloaliphatic epoxy and so forth. Mixtures of these epoxy based oligomers can be used. Of these materials it is preferred to use a diacrylate terminated Bisphenol A epoxy oligomer. They have weight average molecular weights of from about 500 to about 1,500. Such materials are well known to the art and to the literature, as for example, Cargill Resin 1570, a diacrylate ester of a liquid bisphenol A epoxy resin. Examples of other suitable materials can be found in "Heat Resistant Vinyl Ester Resin," M.B. Launikitis, Technical Bulletin, SC:116-76, Shell Chemical Company, June 1976 and Shell Chemical Company Technical Bulletins SC:16-76 and C:60-78.

A copolymerizable ethylenically unsaturated monomer is used to copolymerize and to crosslink the polymerizable oligomers and includes styrene (preferred), alpha methyl styrene, vinyl toluene, t-butyl styrene, chlorostyrene, methyl methacrylate, diallyl phthalate (with styrene or methyl methacrylate and the like), triallyl cyanurate, triallyl isocyanurate, divinyl benzene, methyl acrylate and so forth and mixtures thereof. The unsaturated monomer is used in an amount of from about 80 to about 160 parts by weight and preferably from about 80 to about 120 parts by weight per 100 parts by weight of the polymerizable epoxy based oligomer.

For further copolymerization and crosslinking and to improve hardness of the resulting coating there is used in the in-mold coating composition a monoethylenically unsaturated compound having an

group and a —NH$_2$, —NH— and/or —OH group. Examples of such monomeric compounds are hydroxyl propyl methacrylate (preferred), hydroxyethyl methacrylate, hydroxy ethyl acrylate, hydroxy ethyl crotonate, hydroxypropyl acrylate, hydroxy polyoxypropylene acrylate, hydroxy polyoxypropylene methacrylate, hydroxy polyoxyethylene methacrylate, acrylamide, methacrylamide, N-hydroxymethyl acrylamide, N-hydroxymethyl methacrylamide, and so forth, and mixtures of the same. These compounds are used in an amount of from about 10 parts to about 120 parts by weight and preferably from about 10 to about 60 parts by weight per 100 parts by weight of the polymerizable epoxy based oligomer.

Heretofore, adhesive agents such as polyvinyl acetate have been employed in large amounts to improve adhesion of the in-mold coating compound. However, it has now been unexpectedly found that utilization of drastically reduced amounts of the adhesive agent or even complete elimination thereof, i.e., no adhesive agent at all utilized (0%), still result in good coverage at reduced coating weights. This result is not fully understood.

Although it was expected that hardness would improve by employing smaller amounts of the adhesion agent, the ability to utilize lower coating weights was not. Also unexpected was the fact that no lost in adhesion was obtained and that the in-mold coating has less tendency to streak at the end of flow. Adhesion agents include various polymers or copolymers made from an alkyl methacrylate wherein the alkyl portion generally has from 1 to 6 carbon atoms, desirably from 1 to 4 carbon atoms, and preferably 1 or 2 carbon atoms, that is methyl or ethyl. Thus, preferred polymers include methyl methacrylate, ethyl methacrylate, and the like. The molecular weight of the polymers generally are given in terms of inherent viscosity, that is, inherent viscosity of a solution containing 0.25 grams of the polymer and 50 milliliters of methylene chloride measured at 20° C. using a number 50 Cannon-Fenske viscometer. The inherent viscosity of such polymers is generally from about 0.15 to about 1.3 and preferably from about 0.2 to about 0.6. Such alkyl methacrylate polymers are known to the art and can be commercially obtained from Du Pont under the mark "ELVACITE." Another adhesive agent which is preferred is polyvinyl acetate which has a molecular weight of from about 50,000 to about 200,000 and preferably from about 80,000 to about 150,000.

The drastically reduced amounts of the adhesion agent of the present composition is generally up to 18 or 15 parts by weight, desirably up to 12 parts by weight, and preferably up to 8 parts by weight, per 100 parts by weight of the epoxy based polymerizable oligomer. Such effective yet generally low or minute amounts of adhesion agent result in good coverage, as apparent from the data set forth hereinbelow, with approximately at least a 20 percent by weight reduction and preferably at least 30 percent by weight reduction of the amount of in-mold composition heretofore required to coat the substrate.

As a mold release agent as well as a secondary cure accelerator, various zinc salts of fatty acids having at least 10 carbon atoms can be utilized. Fatty acids are well known. See "Organic Chemistry," Fieser and Fieser, D.C. Health and Company, Boston, 1944, pages 88, 381-390, 398 and 401, "Hackh's Chemical Dictionary," Grant, McGraw Hill Book Company, New York, 1969, page 261, and "Whittington's Dictionary of Plastics," Whittington, Technomic Publishing Co., Inc., Stamford, Conn., 1968, pages 35, 102 and 261, all of which are hereby fully incorporated by reference. Mixtures of zinc salts of the fatty acids can be used. Examples of some zinc salts are zinc palmitate, zinc stearate, zinc ricinoleate, and the like. It is preferred to use the zinc salt of a saturated fatty acid such as zinc stearate. The zinc salt is used in an amount from about 0.2 to 5 parts by weight and preferably from about 0.2 to about 2.5 parts by weight per 100 parts by weight of the polymerizable epoxy based oligomer.

Optionally and desirably a calcium salt of a fatty acid having at least 10 carbon atoms, from about 0.2 to 5 parts by weight of calcium salt per 100 parts by weight of the polymerizable epoxy based oligomer, can also be used in the in-mold coating composition as a mold release agent and to control the rate of the cure. Fatty acids are well known such as those set forth hereinabove. Mixtures of calcium salts of the fatty acids can be used. Examples of some calcium salts are calcium stearate, calcium palmitate, calcium oleate and the like. It is preferred to use the calcium salt of a saturated fatty acid like calcium stearate.

An accelerator is used for the peroxide initiator and is a material such as a drier, e.g., cobalt octoate (preferred). Other materials which can be used are zinc naphthenate, lead naphthenate, cobalt naphthenate and manganese naphthenate. Soluble Co, Mn and Pb salts of linoleic acid, also, can be used. Mixtures of accelerators can also be used. The accelerator is used in an amount of from about 0.01 to about 1 part and preferably from about 0.01 to about 0.5 parts by weight per 100 parts by weight of the polymerizable epoxy based oligomer.

Conductive carbon black is used in the in-mold coating composition in an amount of from about 5 to 30 parts and preferably from about 5 to about 15 parts by weight per 100 parts by weight of the polymerizable epoxy based oligomer.

A filler is used in the in-mold coating composition in an amount of from about to 50 to about 155 parts by weight and preferably from about 50 to about 120 parts by weight per 100 parts by weight of the polymerizable epoxy based oligomer. Examples of fillers are clay, MgO, Mg(OH)$_2$, CaCO$_3$, silica, calcium silicate, mica, aluminum hydroxide, barium sulfate, talc, hydrated silica, magnesium carbonate and mixtures of the same. The fillers should generally be of a small particle size. Of these fillers, talc is preferred. The fillers can be utilized to impart a desired viscosity and flow to the in-mold composition for molding and contribute to desired physical properties in the resulting thermoset in-mold coating. Fillers, can also improve adhesion. However, care should be exercised in the use of high filler contents as this can yield high viscosities and result in flow and handling difficulties.

Optionally, there is employed in the in-mold coating composition a copolymerizable or cocurable diacrylate compound having a weight average molecular weight of from about 250 to 5,000, in an amount of from about 5 to about 120 parts by weight and preferably from about 5 to about 60 parts by weight per 100 parts by weight of the polymerizable epoxy based oligomer. Such cocurable diacrylate compounds include (1) at least one polyoxyalkylene glycol based oligomer having two acrylate groups, and (2) at least one polyurethane based oligomer having two acrylate groups, and mixtures of (1) and (2). Although the above-noted amounts of (1) and (2) can be utilized, it has been found that it is desirable to eliminate such compounds since they reduce hardness at high temperatures, e.g., at 300° F.

Examples of said diacrylate compounds (1) include triethylene glycol diacrylate, tetraethylene glycol diacrylate, tetraethylene glycol dimethacrylate, polyethylene glycol diacrylate, polypropylene glycol diacrylate, polyethylene glycol dimethacrylate or polyoxyethylene glycol dimethacrylate (preferred), polypropylene glycol diacrylate, and so forth, and mixtures thereof. These acrylates are made by reacting polyoxyalkylene glycols such as polypropylene ether glycol with acrylic acid, methacrylic acid, and the like. Since some of these reactive difunctional materials can be made by reacting unsaturated acids and alcohols, they can contain some OH and/or COOH groups.

Examples of said diacrylate compounds (2) for use in said in-mold coating composition include a polyesterurethane diacrylate, a polyetherurethane diacrylate, a polyesteretherurethane diacrylate, or other polyurethane oligomer having two acrylate groups. These materials may be made by reacting a polyetherdiol (e.g., a polypropylene ether diol), a polyesterdiol (e.g., a polyethylene adipate diol), and/or a polyetherester diol (e.g., a polypropylene ether adipate diol), and so forth with a diisocyanate like tolyene diisocyanate, 4,4'-diphenylmethane diisocyanate, hexamethylene diisocyanate and the like in an amount sufficient to form a diisocyanate terminated polyurethane prepolymer which is then reacted with hydroxy propyl acrylate, hydroxy ethyl acrylate, hydroxy ethyl methacrylate and so forth to form the diacrylate terminated polyurethane oligomer or polymer. Mixtures of these acrylate terminated polyurethane oligomers can be used. The term "acrylate" as used here is intended to cover methacrylate and ethacrylates as well as acrylates. Of these materials it is preferred to use a diacrylate polyesterurethane oligomer. Acrylate terminated polyurethane oligomers, e.g., curable by light, ultraviolet, electric beam and/or infrared and so forth, are well known, and sometimes are referred to as irradiation or radiation curable materials.

The diacrylate compounds (1) and/or (2), above, reduce the hardness of the in-mold coating.

An organic free-radical or free radical generator initiator (catalyst) such as a peroxide is used to catalyze the polymerization, copolymerization and/or crosslinking of the ethylenically unsaturated oligomers and the other ethylenically unsaturated materials. Examples of free-radical initiators, include tertiary butyl perbenzoate, tertiary butyl perocotate in diallyl phthalate, diacetyl peroxide in dimethyl phthalate, dibenzoyl peroxide, di(p-chlorobenzoyl) peroxide in dibutyl phthalate, di(2,4-chlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3,5-dimethyl-1,2-oxacyclopentane, 1,1-bis(t-butyl peroxy)-3,3,5-trimethyl cyclohexane, and the like and mixtures thereof. It is desirable sometimes to use mixtures of initiators to take advantage of their different decomposition rates and times at different temperatures and the like. A preferred initiator to use is tertiary butyl perbenzoate. The peroxide initiator should be used in an effective amount to overcome the effect of the inhibitor and to cause crosslinking or curing of the ethylenically unsaturated materials. In general, the peroxide initiator is used in an amount of up to about 5 percent and preferably up to about 2 percent, by weight based on the weight of the ethylenically unsaturated materials employed in the in-mold coating composition.

The unsaturated materials mentioned above, thus, are used in an effective amount to provide on cure (e.g., polymerization, copolymerization and/or crosslinking) a thermoset composition.

To prevent premature gelation of the ethylenically unsaturated materials and to provide for improved shelf-life or storageability inhibitors are added in the desired amount to the composition or are provided in the raw materials before use. Examples of inhibitors include hydroquinone, benzoquinone, p-t-butyl catechol and the like and mixtures thereof.

Optionally, the in-mold composition can be compounded with other mold release agents, antidegradants, UV absorbers, paraffin wax, solid glass or resin microspheres, thickening agents, low shrink additives and the like. These compounding ingredients should be used in amounts sufficient to provide satisfactory results with respect to their intended purpose. It is not desirable to use in the in-mold composition of this invention materials like butadiene-styrene block copolymers or fatty alcohol phosphates.

For ease in handling, materials like polyvinyl acetate may be dissolved in a reactive monomer like styrene. The viscosity of the oligomers can be reduced by dilution with styrene and the like. The ingredients of the in-mold composition should be readily mixed and handled at ambient or room temperature or temperatures below the polymerization temperature so that they may be readily pumped to the mold and injected into the same. The ingredients can be warmed or heated before or during mixing and mixed in steps to facilitate thorough mixing, dispersion and solution of the same. Also, the bulk of the ingredients can be thoroughly mixed and the remainder including the catalyst separately mixed and then both can be pumped to a mixing head to be mixed together and then injected into the mold.

With the peroxide initiator or catalyst the in-mold composition exhibits a shelf-life at room temperature (about 25° C.) of about a week, and without the initiator it exhibits a shelf life of several months at room temperature. Thus, the initiator is preferably added to the composition and thoroughly mixed therewith just before molding.

All of the ingredients of the in-mold coating composition should be kept dry or have a minimal amount of moisture or the water content should be controlled to obtain reproducible results and to prevent pore formation.

Mixing of the ingredients of the in-mold composition should be thorough. Injection or compression, transfer molding, or other molding apparatus or machines can be used for the in-mold coating. Molding apparatus and methods may be found in U.S. Pat. Nos. 4,076,780; 4,076,788; 4,081,578; 4,082,486; 4,189,517; 4,222,929; 2,245,006; 4,239,796; 4,239,808 and 4,331,735; in articles such as "Proceedings of the Thirty-Second Annual Conference Reinforced Plastics/Composites Institute," SPI, Washington, February 1977, Griffith et al, Section 2-C, pages 1-3 and "33rd Annual Technical Conference, 1978 Reinforced Plastics/Composites Institute The Society of the Plastics Industry, Inc.," SPI, Ongena, Section 14-B, pages 1-7, all of which are hereby fully incorporated by reference. The in-mold coating composition can be applied to the substrate and cured at a temperature of from about 290° to 310° F., and at a pressure of about 1,000 psi for from about 0.5 to 3 minutes.

The processes and products of the present invention can be used in the manufacture of automobile parts such as grille and headlamp assemblies, deck hoods, fenders, door panels and roofs as well as in the manufacture of food trays, appliance and electrical components, furniture, machine covers and guards, bathroom components, structural panels and so forth.

The glass fiber reinforced thermoset plastic (FRP) such as the polyester resin or vinyl ester resin and glass fiber composition substrate to which the in-mold composition is applied can be a sheet molding compound (SMC) or a bulk molding compound (BMC), or other thermosetting FRP material as well as a high strength molding composition (HMC) or a thick molding compound. The FRP substrate can have from about 10 to about 75 percent by weight of glass fibers. The SMC compound usually contains from about 25 to about 30 percent by weight of glass fibers while the HMC compound may contain from about 55 to about 60 percent by weight of glass fibers. The glass fiber reinforced thermoset plastic (FRP) substrate can be rigid or semi-rigid. In lieu of glass fibers, other conventional fibers known to the art and to the literature can also be utilized either separately, or in combination. Examples of such fibers include carbon fibers, boron fibers, graphite fibers, nylon fibers, and the like. The substrate can contain flexibilizing polymers, e.g., contain a flexibilizing moiety such as an adipate group in the polyester, elastomers such as the styrene-butadiene block copolymers, plastomers, and the like. Examples of unsaturated polyester glass fiber thermosets are set forth in "Modern Plastics Encyclopedia," 1975-1976, October 1975, Vol. 52, No. 10A, McGraw-Hill, Inc., New York, pages 61,62 and 105 to 107; "Modern Plastics Encyclopedia," 1979-1980, October 1979, Volume 56, Number 10A, pages 55, 56, 58, 147 and 148, and "Modern Plastics Encyclopedia," 1980-81, October 1980, Volume 57, Number 10A, pages 59, 60, and 151 to 153, McGraw-Hill, Inc., New York, N.Y., and in various Shell Chemical Company Technical Bulletins on vinyl esters, noted hereinabove, all of which are hereby fully incorporated by reference.

The compositions of the present invention generally exhibit good pumpability and flow in the mold. They can give rapid cures as low as 25 to 50 seconds at 300° F. They also show good adhesion to paints and can be used not only as an in-molding coating to cover blemishes but as a good conductive coating for electrostatic painting and as a primer for most paint finish systems such as soluble acrylic lacquers, acrylic dispersion lacquers, water borne acrylic enamels, high solids solution acrylic enamels, acrylic non-aqueous dispersions and urethanes.

The invention will be better understood by reference to the following examples wherein parts noted are parts by weight unless otherwise indicated.

EXAMPLES

The following one-component conductive in-mold coating formulations were made:

|  | 1 | 2 | 3 | 4 |
|---|---|---|---|---|
| Low Profile Add. LP-90[A] | 75.0 | 75.0 | 25.0 | — |
| (40% Solution) | (30) | (30) | (10) |  |
| Sartomer SR-252[B] | 15.0 | — | — | — |
| Hydroxypropyl methacrylate[C] | 30.0 | 30.0 | 30.0 | 30.0 |
| Styrene | 33.0 | 33.0 | 63.0 | 78.0 |
| 2% BQ in Styrene | 7.0 | 7.0 | 7.0 | 7.0 |
| 1. Materials Mixed |  |  |  |  |
| Zinc Stearate | 1.45 | 1.45 | 1.55 | 1.55 |
| Calcium Stearate | 0.20 | 0.20 | 0.30 | 0.30 |
| Cobalt Hex-Cem (12%) | 0.15 | 0.15 | 0.15 | 0.15 |
| 2. Materials Added and Mixed | 85.0 | 100.0 | 100.0 | 100.0 |
| Cargill Resin 1570[D] |  |  |  |  |
| 3. Added and Mixed |  |  |  |  |
| Vulcan XC-72R[E] | 10.0 | 10.0 | 8.5 | 8.5 |
| Talc Filler[F] | 80.0 | 80.0 | 80.0 | 80.0 |

|  | 1 | 2 | 3 | 4 |
|---|---|---|---|---|
| 4. Materials Added and Blended |  |  |  |  |

[A]Low Profile Add. LP-90 (40 percent by weight of polyvinyl acetate in styrene). Union Carbide Corp.
[B]Sartomer SR-252 - Polyoxyethylene glycol 600 dimethacrylate. Sartomer Corporation.
[C]Hydroxypropyl methacrylate (ROCRYL 410). Rohm and Haas Company.
[D]Cargill Resin 1570 - diacrylate ester of a liquid Bisphenol A epoxy resin. Cargill Corporation
[E]Vulcan XC-72R - conductive furnace carbon black. Cabot Corporation.
[F]Talc Filler - hydrous magnesium silicate. Whittaker, Clark, & Daniels.

The manner of preparing the above in-mold coating compositions was as follows with regard to Example 3.

| Method of Preparation | | |
|---|---|---|
| Low Profile Add. LP-90 | 20.0 | |
| Hydroxypropyl Methacrylate | 30.0 | |
| Styrene | 33.0 | |
| 2% BQ in Styrene | 7.0 | |
| 1. These materials were charged to a reactor and blended. While charging, heating was commenced to maximum of 38° C. (100° F.). | | |
| Low Profile Add. LP-90 | 5.0 | 7.00 |
| Zinc Stearate | 1.55 | |
| Calcium Stearate | 0.30 | |
| Cobalt Hex-Cem (12%) | 0.15 | |
| 2. The above materials were preblended using a high shear mixer and charged to the reactor and blended. | | |
| Styrene | | 25.00 |
| 3. The styrene was added and blended well. | | |
| Vulcan XC-72R | | 8.5 |
| 4. The carbon black was added and mixed for 30 minutes. While mixing, heat to 44° C. (110° F.). Once the materials have reached 44° C. (110° F.), the heat was removed and cooling water applied. | | |
| Cargill Resin 1570 [preheated to 49° C. (120° F.)] | | 100.0 |
| 5. The Cargill Resin 1570 was added and mixed until the material was uniform. During the addition of the Cargill Resin 1570, cooling will be required to prevent the temperature from rising. After the Cargill Resin 1570 was added and mixed, the composition was cooled to 38° C. (100° F.). | | |
| WC & D 4404 Talc | | 80.0 |
| 6. The talc was added and mixed for 1 hour while holding the temperature at 38° C. (100° F.). The sample was removed and the gel time checked. | | |
| Viscosity - 86° F., #7 Spindle @ 100 RPM | | 5,000-10,000 |
| Gel Time* - 200° F. | | 6.5-8.0 minutes |

*1.5 pt. TBPB per 100 parts resin. When making up material for checking the gel time, weigh out 100.0 grams of resin, add 1.50 grams of TBPB and mix thoroughly. Transfer a portion of the catalyzed resin to a test tube, place the test tube in the oil bath and stir slowly with the thermocouple until the temperature reaches 170° F. Stop stirring at this point and determine the peak polyester gel time from the exotherm curve.

In a similar manner, Examples 1, 2 and 4 were prepared except that the ingredients were slightly different as set forth in the above table.

The above compositions were then in-mold coated onto substrates of molded thermoset conventional polyester-styrene-glass fiber compositions containing about 25 percent by weight of glass fibers and approximately 1,000 psi at 300° F. for about 45 seconds.

The coverage results with regard to coating truck fenders or rear quarter panels are as follows

TABLE I

| Shot Size (Gms.) | Coverage (%) | Thickness (Mills) |
|---|---|---|
| CHEVROLET CK TRUCK FENDER | | |
| *Example 1* | | |
| 107 | 100 | 2.55 |
| 85 | 80 to 85 | — |
| *Example 2* | | |
| 107 | 100 | 2.55 |
| 85 | 80 to 85 | — |
| *Example 3* | | |
| 85 | 100 | 2.05 |
| *Example 4* | | |
| 85 | 100 | 2.0 |
| CORVETTE REAR QUARTER PANEL | | |
| *Example 1* | | |
| 75 | 100 | 2.60 |
| 40 | 75 to 80 | — |
| *Example 2* | | |
| 75 | 100 | 2.60 |
| 40 | 75 to 80 | — |
| *Example 3* | | |
| 40 | 100 | 1.95 |

As apparent from Table I, when the shot size or the amount of the in-mold coating composition was reduced from 107 grams to approximately 85 grams, a reduction of approximately 20 percent, complete, i.e. 100 percent, coverage was not obtained but rather only 80 to 85 percent. The same is true with regard to Example 2 wherein the Sartomer was eliminated. However, as apparent from Examples 3 and 4 in which 10 parts by weight and 0 parts by weight, respectively, of the polyvinyl acetate adhesive agent were utilized, 100 percent coverage was obtained. This result was completely unexpected in that heretofore it was always thought that high amounts of an adhesive agent were essential. With regard to the Corvette rear quarter panel in-mold coatings, the same trend was observed. That is, a reduction in excess of 45 percent by weight of a coating applied still resulted in 100 percent coverage in Example 3 as compared to the control of Example 1. Hence, great cost savings can be obtained by utilizing the present invention.

Examples A through F generally relate to the use of reduced amounts of an adhesive agent which is polymethyl methacrylate.

TABLE II

| | A | B | C | D | E | F |
|---|---|---|---|---|---|---|
| Hydroxypropyl Methacrylate[1] | 30.0 | 30.0 | 30.0 | 30.0 | 30.0 | 30.0 |
| Styrene | 78.0 | 78.0 | 78.0 | 78.0 | 78.0 | 78.0 |
| 2% BQ in Styrene | 7.0 | 7.0 | 7.0 | 7.0 | 7.0 | 7.0 |
| Vinac B-15[2] | 10.0 | — | — | — | — | — |
| Elvacite 2008[3] | — | 10.0 | — | — | — | — |
| Elvacite 2009[4] | — | — | 10.0 | — | — | — |
| Elvacite 2113[5] | — | — | — | 10.0 | — | — |
| Elvacite 2028[6] | — | — | — | — | 10.0 | — |
| Elvacite 2043[7] | — | — | — | — | — | 10.0 |
| *While mixing, add the polymer beads and mix until dissolved* | | | | | | |
| Zinc Stearate | 1.55 | 1.55 | 1.55 | 1.55 | 1.55 | 1.55 |
| Calcium Stearate | 0.30 | 0.30 | 0.30 | 0.30 | 0.30 | 0.30 |
| Cobalt Hex-Cem (12%) | 0.15 | 0.15 | 0.15 | 0.15 | 0.15 | 0.15 |
| *Materials added and mixed* | | | | | | |
| Cargill Resin 1570[8] | 100.0 | 100.0 | 100.0 | 100.0 | 100.0 | 100.0 |
| *Material added and mixed* | | | | | | |
| Vulcan XC-72R[9] | 8.5 | 8.5 | 8.5 | 8.5 | 8.5 | 8.5 |
| Talc Filler [10] | 80.0 | 80.0 | 80.0 | 80.0 | 80.0 | 80.0 |
| *Materials added and blended* | | | | | | |
| Brookfield viscosity (cps) at 86° F., #7 Spindle at 100 RPM | 6,800 | 5,200 | 8,000 | 900 | 5,200 | 6,200 |
| *To each composition 1.5 parts by weight of the initiator TBPB was added per 100 parts by weight of the total in-mold coating composition.* | | | | | | |
| Gel Time at 200° F. | 5.6/315° F. | 5.4/336° F. | 5.5/310° F. | 5.2/316° F. | 5.6/316° F. | 5.7/318° F. |
| *In-mold coating properties on molded thermoset glass fiber-polyester-styrene substrates* | | | | | | |
| Hot Strength | Good | Good | Good | Good | Good | Good |
| Adhesion (scalpel, a screen test) to substrate | Good | Good | Good | Good | Good | Good |
| Release from mold | Good | Good | Good | Good | Good | Good |
| Conductivity (Ransberg meter reading) | 165 | 165 | 165 | Erratic-Poor | 165 | 165 |

[1] Hydroxypropyl methacrylate (ROCRYl 410) Rohm and Haas Company
[2] Vinac B-15 Polyvinyl acetate homopolymer Air Products
[3] Elvacite 2008 Polymethyl methacrylate Du Pont
[4] Elvacite 2009 Polymethyl methacrylate Du Pont
[5] Elvacite 2013 Polymethyl-n butyl methacrylate copolymer Du Pont
[6] Elvacite 2028 Polyethyl methacrylate Du Pont
[7] Elvacite 2043 Polyethyl methacrylate Du Pont
[8] Cargill Resin 1570 - anacrylate ester of a liquid Bisphenol A epoxy resin. Cargill Corp.
[9] Vulcan XC-72R - conductive furnace carbon black. Cabot Corp.
[10] Talc Filler - hydrous magnesium silicate. Whittaker, Clark & Daniels As apparent from Table II, utilization of the various methacrylate adhesive agents generally gave good in-mold coating properties such as hot strength, adhesion, release from mold, conductivity, and the like.

Further examples have demonstrated that coatings similar to that of Example 4 (that is, containing absolutely no polyvinyl acetate therein) can completely coat (that is, 100 percent coverage) a flat plastic substrate (390 square inches) as via an in-mold coating procedure using a minimum shot size of at least 5 grams, desirably at least 10 grams and preferably at least 15 grams. Such shot sizes constitute dramatic reduction from the shot size required utilizing the coating of Example 1 (i.e., a control).

While in accordance with the Patent Statutes, the best mode and preferred embodiment has been set forth, the scope of the invention is not limited thereto, but rather by the scope of the attached claims.

What is claimed is:

1. A laminate, comprising:
   a thermoset in-mold coating composition adhered to a molded thermoset polyester resin or thermoset vinyl ester resin fiber composition containing from about 10 percent to about 75 percent by weight of fibers therein, said in-mold coating composition comprising,
   (a) 100 parts by weight of at least one polymerizable epoxy based oligomer having at least two acrylate groups and a weight average molecular weight of from about 500 to about 1,500;
   (b) from about 80 to about 160 parts by weight of at least one copolymerizable ethylenically unsaturated monomer;
   (c) from about 10 to about 120 parts by weight of at least one copolymerizable monoethylenically unsaturated compound having a —CO— group and a —NH$_2$, —NH—, and/or —OH group; and
   (d) up to about 18 parts by weight of an adhesive agent,
   said thermoset in-mold coating composition coating said molded thermoset polyester resin or said molded thermoset resin fiber composition.

2. A laminate according to claim 1, wherein said adhesive agent is polyvinyl acetate, a polymer or copolymer made from an alkyl methacrylate monomer wherein said alkyl group of said adhesive agent (d) has from 1 to 6 carbon atoms, or combinations thereof.

3. A laminate according to claim 2, wherein the amount of said (b) monomer is from about 80 to about 120 parts by weight, wherein the amount of (c) compound is from about 10 to about 60 parts by weight, wherein the amount of said adhesive agent is up to about 12 parts by weight, and wherein said alkyl portion of said adhesive agent (d) of said alkyl methacrylate has from 1 to 4 carbon atoms.

4. A laminate according to claim 3, wherein said alkyl methacrylate monomer of (d) is methyl methacrylate, ethyl methacrylate, or combinations thereof, and wherein said fibers of said resin fiber compositions are glass fibers.

5. A laminate according to claim 4, wherein said polymerizable epoxy-based oligomer of (a) is a diacrylate ester of a liquid bisphenol A epoxy resin, wherein said (b) monomer is styrene, and wherein said (c) compound is hydroxypropyl methacrylate.

6. A laminate according to claim 2, wherein said amount of said adhesive agent is up to about 15 parts by weight.

7. A laminate according to claim 5 wherein said amount of said adhesive agent is up to about 8 parts by weight.

* * * * *